United States Patent [19]

Redmond et al.

[11] Patent Number: 4,820,170

[45] Date of Patent: Apr. 11, 1989

[54] LAYERED ELASTOMERIC CONNECTOR AND PROCESS FOR ITS MANUFACTURE

[75] Inventors: John P. Redmond, Mechanicsburg; Ray N. Shaak, Lebanon; Albert Shirk, Palmyra; Larry A. Cracraft, Hummelstown, all of Pa.

[73] Assignee: AMP Incorporated, Harrisburg, Pa.

[21] Appl. No.: 148,191

[22] Filed: Jan. 27, 1988

Related U.S. Application Data

[63] Continuation of Ser. No. 898,857, Aug. 20, 1986, abandoned, which is a continuation of Ser. No. 683,987, Dec. 20, 1984, abandoned.

[51] Int. Cl.$^4$ .............................................. H01R 9/09
[52] U.S. Cl. ........................................ 439/66; 439/91; 439/591
[58] Field of Search .............................. 439/66, 86–88, 439/91, 591

[56] References Cited

U.S. PATENT DOCUMENTS

| | | | |
|---|---|---|---|
| 1,382,208 | 6/1921 | Maranville | 156/265 |
| 3,638,163 | 1/1972 | Loosme | 339/17 M |
| 3,795,884 | 3/1974 | Kotaka | 29/629 |
| 3,851,297 | 11/1974 | Munro | 339/61 M |
| 3,852,878 | 12/1974 | Munro | 339/17 LM |
| 3,930,308 | 1/1976 | Munro | 29/629 |
| 3,982,320 | 9/1976 | Buckoff et al. | 339/17 LM |
| 3,985,413 | 10/1976 | Evans | 339/17 LM |
| 3,998,513 | 12/1976 | Kobayashi et al. | 339/59 M |
| 4,057,311 | 11/1977 | Evans | 339/17 M |
| 4,093,480 | 6/1978 | Blalock et al. | 29/629 |
| 4,100,385 | 7/1978 | Wutz | 339/278 C |
| 4,118,092 | 10/1978 | Sado et al. | 339/59 M |
| 4,293,293 | 5/1980 | Gilissen et al. | 339/17 F |
| 4,295,700 | 10/1981 | Sado | 339/61 M |
| 4,344,662 | 8/1982 | Dalamangas et al. | 339/DIG. 3 |
| 4,348,263 | 9/1982 | Draper et al. | 339/278 C |
| 4,408,814 | 10/1983 | Takashi et al. | 339/59 M |
| 4,449,774 | 5/1984 | Takashi et al. | 339/59 M |
| 4,598,960 | 7/1986 | Di Santo et al. | 439/66 |
| 4,681,497 | 7/1987 | Berecz | 439/86 |
| 4,729,166 | 3/1988 | Lee et al. | 439/86 |

FOREIGN PATENT DOCUMENTS

| | | |
|---|---|---|
| 2101036 | 7/1972 | Fed. Rep. of Germany . |
| 197808 | 8/1978 | Fed. Rep. of Germany ... 339/DIG. 3 |
| 3133188 | 5/1982 | Fed. Rep. of Germany . |
| 0113277 | 12/1983 | France . |
| 2087655 | 5/1982 | United Kingdom . |
| 2133227 | 7/1984 | United Kingdom ......... 339/DIG. 3 |

OTHER PUBLICATIONS

"Conductive Elastomers Make Bid to Take Over Interconnections" from Product Engineering, Dec. 1974 Issue, vol. 45, No. 12.
International Search Report for International Application No. PCT/US 85/0226 3.

*Primary Examiner*—Gil Weidenfeld
*Assistant Examiner*—Paula A. Austin
*Attorney, Agent, or Firm*—Bruce J. Wolstoncroft

[57] ABSTRACT

Provided herein are novel layered elastomeric connectors, housings therefor and methods of manufacture for the connectors which includes alternating fused layers of a dielectric elastomer and electrically conductive fibrous mats coextensive with a cross section of the conductor to provide a multiplicity of conductive pathways between two electrically conductive surfaces.

20 Claims, 4 Drawing Sheets

LAYERED ELASTOMERIC CONNECTOR AND PROCESS FOR ITS MANUFACTURE

This application is a continuation of application Ser. No. 898,857 filed Aug. 20, 1986, now abandoned, which is an continuation of application Ser. No. 683,987, filed Dec. 20, 1984, now abandoned.

TECHNICAL FIELD

This invention relates to improvements in electrical interconnectors. More particularly, the invention relates to layered elastomeric connectors including alternating fixed layers of dielectric elastomer and fibrous mats electrically conductive and a housing structure therefor.

BACKGROUND OF THE INVENTION

As a result of increasing complexity and miniaturization associated with the electronic assembly and computer arts, the demand for more sophisticated and reliable connectors has increased. Smaller size, lighter weight packaging and an augmented necessity for reliability have virtually rendered obsolete individually soldered connectors in many areas of the industry. For example, printed circuit boards, digital watches, portable calculators, etc., have generated the need for connectors having the ability to reliably connect a large number of electrically conductive traces on closer centers in a compact area. By no means exhaustive, the following list defines certain desirable characteristics for a connector: low contact resistance; close contact spacing; vibration damping; providing an environmental seal; elimination of the need for precise alignment; inherent low contact insertion force; easily modified shape and size to meet specifications; low production cost, etc.

A new class of connectors has evolved to satisfy these characteristics. They are layered elastomeric connectors (LEC). LEC's generally are composed of alternating layers of dielectric elastomer and an elastomer filled or doped with electrically conductive material such as silver particles, graphite particles, conductive fabrics, wires, etc. The dielectric elastomer layers are sandwiched between the conductive layers and are of sufficient thickness to insulate the conductive layers from one another and therefore prevent the formation of electrically conductive or leakage pathways between the conductive layers. Among the many elastomers available for use, silicon rubbers have been settled upon as providing the material properties suitable for manufacture of LEC's.

Silicone rubbers possess a low harness, are very temperature stable, have a low compression set and reasonable chemical inertness, and lastly, are fairly easy to process and fabricate. An LEC composed of alternating layers of a dielectric silicone rubber and a conductive particle filled silicone elastomer provides a connector having a large number of conductive pathways in a small volume for closer contact spacing which may even provide for redundant contacts for the same electrical traces. Due to the inherent vibration damping of the elastomer, an LEC connecting fragile components will demonstrate protective characteristics especially against fretting corrosion and abrasion. Additionally, the compressibility of an LEC, upon compression onto electronic traces, provides an environmental seal in the contact zones reducing harmful effects of dust and moisture.

LEC's provide the additional advantage of easy modification of both geometric configuration and size to meet specifications for a particular use. This adaptability as well as the low cost of and ease of manufacture of LEC's, among the other aforementioned features, have generated an increasing demand for LEC's.

An example of an LEC providing these features is described in British Pat. No. 2087655. Therein are disclosed a number of embodiments for an LEC having an irregular cross section which includes a series of whisker-like projections from two oppositely facing peripheral surfaces. The projections are composed of discrete unidirectionally aligned linear carbon fiber or metal wire bodies imbedded in an electrically conductive particle-filled elastomer. A further illustration of an LEC is provided in U.S. Pat. No. 4,295,700 disclosing an LEC where the alternating electrically conductive layers may be composed of conductive particle filled elastomer, woven cloth where the wood fibers are conductive but the warp fibers are dielectric or an identical embodiment that was described in the aforementioned British Patent. Although providing many advantages, certain limitations as to the applicability of LEC's do exist. First, the contact resistance of a typical particle filled elastomer is fairly high. The contact resistance results from the transmission of electrical current across the interface between the traces and the connector and vice versa. Where contact resistance measures about 30 ohm/cm, the applicability of LEC's is reduced for interconnecting high impedance, low amperage devices, e.g., liquid crystal devices. Moreover, heat generated by the high contact resistance may raise the temperature of the connector area sufficiently to damage either the connector itself or the electrical elements nearby.

The aforementioned patents contain modified LEC structures employing projections and fibers to reduce contact resistance. However, the use of the fibers or projecting bodies limit the geometrical configuration and applicability of these LEC's by restricting connections along the surfaces from which the fibers or bodies project.

A further disadvantage of known LEC's is cost. An estimate of conventional selling prices for an LEC is approximately one dollar per inch. Where connectors are used in abundance, particularly with the advent of flat display panels, this cost is too high. For example, an 8-inch by 4-inch panel requires nearly two linear feet of connectors. Based on a projected sales price of two hundred dollars, there would be a twenty-four dollar material cost associated with the connectors alone; simply too much for the product. Thus, it is desirable from an economic perspective to develop a lower priced LEC.

SUMMARY OF THE INVENTION

Accordingly, it is an object of this invention to provide an LEC possessing the desirable characteristics associated with LEC's generally and overcoming recognized limitations thereof.

Another object of this invention is to provide an LEC having minimal contact spacing, requiring minimum contact insertion force, possessing vibration damping characteristics and capable of use in a myriad of geometric cross-sectional configurations.

It is another object of this invention to provide an LEC possessing equal and/or superior properties relative to known LEC's.

Still another object of this invention is to provide an LEC demonstrating improved characteristics including closer contact spacing for redundant contacts, environmental sealing, reduced contact resistance and lower manufacturing cost.

These and other objects are satisfied by a layered elastomeric connector for connecting at least two distinct electrical paths comprising a plurality of electrically conductive fibrous may layers coextensive with the cross section of the connector across which at least the two electrical conductors are connected to each other, a plurality of dielectric elastomeric layers each disposed between two of said mat layers and separating said mat layers to prevent electrical transmission therebetween with said mat layers and said elastomeric layers fused together to form a stratified connector.

These objects and others are further satisfied by a method for manufacturing an LEC including the steps of producing a layered elastomeric connector for establishing electrical contact between at least two discrete electrical conductors, including the steps of selecting a plurality of electrically conductive fibrous mats and a plurality of sheets of a heat-bondable, electrically non-conductive, elastomer of substantially equal cross-sectional size, alternately stacking the elastomer sheets and the fibrous mats to form a layered arrangement, and heating the stacked sheets and mats thereby to bond the fibrous mats and the elastomer into a unitary stratified connector.

Still other objects as well as those listed above are satisfied by a connector assembly incorporating in an LEC, a layered, resilient, compressible elastomeric connector insert comprising a plurality of flexible, electrically conductive, fibrous sheets coextensive with the cross section of the connector, a plurality of dielectric, compressible, elastomeric layers extending coextensive with the cross section of the connector and separating each of said fibrous sheets; said elastomeric sheets and said fibrous sheets forming a unitary stratified body having electrically conductive bodies between each of said elastomeric layers; a housing for said connector, said housing substantially encompassing said connector, and comprising means for compressing said connector perpendicular to the connector cross section, first means for permitting electrical contact between said connector and a first electrically transmittive surface, second means for permitting electrical contact between said connector and a surface of a second electrical path, said second means being adapted to permit at least a portion of said surface of a first of the electrical paths to be inserted within said housing to abut said connector, whereupon insertion of the second surface into said housing, said connector is further compressed and establishes electrical contact between said connector and the surface of said second path.

The commercial availability of silicone elastomers and highly conductive graphitic-carbon fiber paper as well as their relative ease of incorporation into an LEC provide a less expensive and more effective alternative to layered conductive particle filled elastomeric connectors. Graphitic-carbon fiber paper used in an LEC has a bulk resistance rivaling that of much more expensive silver filled elastomer connectors and a lower contact resistance. If the exposed surface of the carbon fiber paper is plated with nickel, copper, or the like, contact resistance is considerably reduced relative to graphite filled elastomers. Carbon fiber paper also enables close contact spacing, e.g., repeating units every 10 mils thereby providing the potential for a number of redundant contacts. The conductive fiber paper mats are also highly flexible and compressible thereby minimally affecting the vibration damping characteristics of the elastomer as well as avoiding distortion within the elastomeric layers while simultaneously maintaining a multiplicity of electrically conductive pathways through the cross section of the connector. Moreover, the conductive paper is capable of modification so as to enhance its electric conductivity by electroplating with various metals.

In summary, the layered elastomeric connector (LEC) contemplated by this invention provides greatly reduced contact resistance, particularly where the carbon fiber paper is electroplated electroless with specific metals, dampens oscillatory and impact forces thereby reducing contact fretting and abrasion, provides an environmental seal against atmospheric pollution, is capable of having very closely spaced contact centers, and is easily produced at a low manufacturing cost.

These and other advantages and objects of this invention will become obvious to one of ordinary skill in the art upon review of the following preferred embodiment.

DETAILED DESCRIPTION OF THE PREFERRED EMBODIMENT

Figure 1:
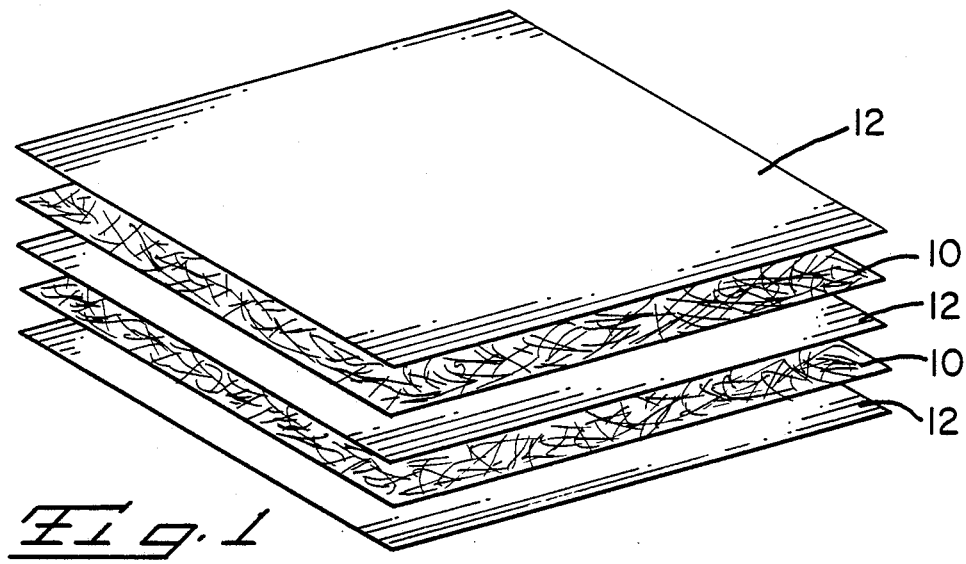
FIG. 1 is an exploded view of the alternating layers of one preferred embodiment of the invention.

Referring now to FIG. 1, it is an exploded view of alternating electrically conductive fibrous mats 10 and elastomeric sheets 12. Fibrous mats 10 are composed of a webbing of electrically conductive fibers. Preferably, mats 10 have a thickness of less than 20 mils and more preferably approximately 5 mils or less. In the context of a layered elastomeric connector, the thinner the layers, the greater the replication of electrical contact points. In other words, if a 2-mil mat and 4-mil insulative material are used, then a contact area exists every 6 mils along the length of the connector. The redundancy of electrical contacts assists in assuring proper connection between two conductive paths.

The ohmic resistance of the fibrous material governs its desirability for use in this invention. Preferably the mats should have a resistivity of less than 0.1 ohm cm which is about 100 times better than that exhibited by carbon-particles field, elastomer materials and approaches the resistivity of silver filled elastomers. An example of material meeting the above-specified criteria is carbon fiber paper. Carbon fiber paper provides an interlocking web of carbon fibers thereby providing a continuous electrically conductive path along and through the paper. The random crossing of fibers over one another causes the paper to demonstrate markedly lower resistance than a carbon particle filled elastomer. Carbon fiber paper is also lightweight and flexible, both desirable features for an elastomeric connector.

To further reduce the resistance of carbon fiber paper or an alternative electrically conductive fibrous mat, it has been determined that electroplating the mat contributes markedly to conductivity. In contrast to more expensive conventional silver filled elastomer LEC's, comparable electrical conductivity is achieved using carbon fiber paper electroplated with less expensive metals such as tin or nickel. It should be noted that if silver electroplated carbon fiber paper is selected, it demonstrates outstanding electrical conductivity far superior to silver particle filled elastomer.

One such preferred graphitic carbon paper contemplated for use in this invention is Panex CFP 30–05 manufactured by Stackpole Fiber Co. of Lowell, Massachusetts. Panex CFP 30–05, composed of 8 micron diameter filaments, is lightweight (1.73 g/cc), has a thickness of 5 mils and has an ohmic resistivity of 0.03 ohms cm. As noted above, the electrical conductivity of this graphitized paper is considerably enhanced by electroplating with electrically conductive metals. Such metals include, alone or in combination, nickel, copper, tin and silver and lead. For continuous plating of mats 10, which in the preferred embodiment is Panex CFP 30–05, the paper is cut into 8-inch by 1-inch strips and connected to an anode and immersed into a plating solution. The plating solution includes salts of one or more of the aforementioned metals which are reduced to elemental metal on the strips by the use of the electrical current. During electroplating, elemental metal deposits are first observed at the intersection of the individual fibers and subsequently along the fibers themselves. Table 1 emphasizes the reduced degree of volume resistivity of plated paper over that exhibited by unplated paper.

TABLE 1

Volume Resistivity
(of conduction layers in a layered elastomeric connector made by electroplating on carbon filled paper)

| Carbon Fiber Paper | 0.8 ohm cm (CONTROL) |
|---|---|
| Copper-Plated | 0.1 ohm cm |
| Nickel-Plated | 0.4 ohm cm |
| Tin-Plated | 0.07 ohm cm |
| Silver-Plated | 0.01 ohm cm |

In order to achieve measurable reductions, the thickness of the metal plating need only be minimal. The thicker of the metal deposits or the paper fibers, the greater the reduction. However, if the metal plating is too thick, above the 250 microinch range, the fibers become rigid which for the purpose of this invention is undesirable due to the corresponding reduction in flexibility.

One preferred embodiment of the fiber paper is tin-plated Panex CFP 30–05 where the volume resistance as measured to average about 0.07 ohm cm while the current carrying capacity is in the range of 1 ampere. If a higher power circuit is involved, the tin can be substituted with silver or another highly conductive metal possessing even less resistivity than tin. Generally, however, the aforementioned characteristics of tin-plated fibers are not only acceptable but also are superior or at least comparable to conventional silver filled elastomeric connectors or stamped metal contacts and are considerably less expensive.

The elastomer selected for use in this invention should be yielding (low Shore A hardness), resilient, and electrically insulative. Any number of organic and inorganic materials such as polyester urethanes, styrene butadene elastomers, copolyester-ether elastomers, exhibit these properties. However, due to their availability, silicon rubbers are contemplated for use in the preferred embodiment.

In one of the preferred embodiments for making test samples, 200 grams of Dow Corning Silastic GP-45, a translucent, dielectric, silicone rubber was compounded with 2.4 grams of Cadox TS-50, a vulcanizing agent which enhances the resiliency of the elastomer, on a two-roll mill at room temperature. Fifty grams of the resulting milled composition were spread out in the cavity of a 10-inch by 12-inch plaque molded and partially cured at 171 degrees Celsius (340 degrees Fahrenheit) for 10 minutes. It was determined that the use of release sheets facilitated removal of the partially cured plaques from the mold. Therefore, two TEFLON glass sheets were placed in the cavity prior to introduction of the elastomeric composition.

Although these curing conditions do not conform with the manufacturer's recommendations, the properties of the resulting elastomer are desirable for the intended purpose of the invention. The elastomer has a hardness of 45A (Shore A durometer), a compression set of 23 percent and an elongation of 570 percent. When removed, the relatively thin elastomer films (10-mil) are cut into one-inch squares with a paper cutter.

The following technique was employed to generate an LEC from alternating layers of elastomer and fibrous conductive paper.

Metal-plated Panex paper strips are immersed into a bath of Laur 201 silicone rubber dispersion. Laur 201, a primer used to bond carbon fiber paper 10 to cured Silastic GP-45 sheets 12, is available from Laur Silicone Rubber Compounding, Inc. of Beaverton, Mich. The dispersion contains a thermally activated cross-linking promoter and is 20 percent solid dispersed in a 1, 1, 1 trichloroethane mixture. After the paper is saturated with the primer, it is removed from the bath and allowed to drain. The strips are then suspended in an oven for 10 to 15 minutes at 100 degrees Celsius to activate the cross-linking promoter thereby partially curing the primer which forms a smooth, tough, grey-colored coating on the exterior surfaces of the paper. Upon removal from the oven, the dry and tack free strips are cut into one-inch squares and are ready for assembly.

An improvement to Laur 201 primer is the use of a silicon-based, amino-functional, coupling agent to improve penetration of and bonding of the silicon elastomer to the carbon fibers. For example, Dow Corning's Z6020, a one-percent N-$\beta$-amoethyl-$\gamma$-amino propyl trimethoxysilone solution from water or isopropanol was found to adequately induce bonding. Other possible candidates for bonding agents include a titanate coupling compound of the type available from Kenrich Petrochemicals, Inc. of Bayonne, New Jersey, such as LICA-38.

Figure 2:
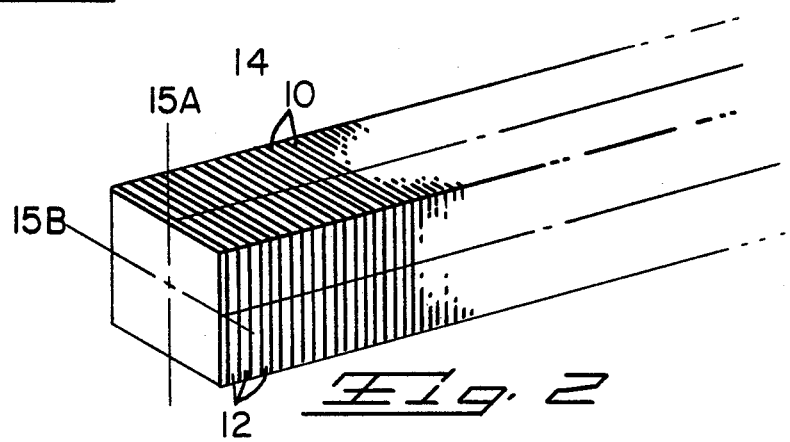
FIG. 2 is a perspective view of a stratified master rod according to one preferred embodiment.

Assembly of the individual layers into a layered configuration is accomplished by stacking alternating squares of elastomer and fiber paper, one on top of the other, until a desired length is achieved. The layers are clamped together with minimum pressure at the upper and lower ends by a C-clamp. The stacked material is placed in an oven at 200 degrees Celsius for 15 to 20 minutes. At the elevated temperature, the interfacing primer and elastomer combine and cure thereby securely bonding the alternating layers into a single, solid, stratified structure. FIG. 2 illustrates stratified master rod 14 which is composed of alternating one-inch squares of Panex fiber paper 10 and Silastic elastomer 12 rebonded together. Master rod 14 is then cut to a desired thickness and length.

Figure 3:
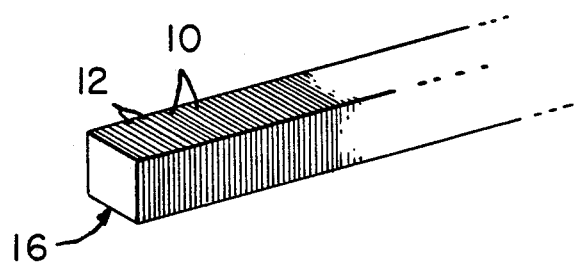
FIG. 3 is a perspective view of an LEC according to a preferred embodiment of this invention.
Figure 4:
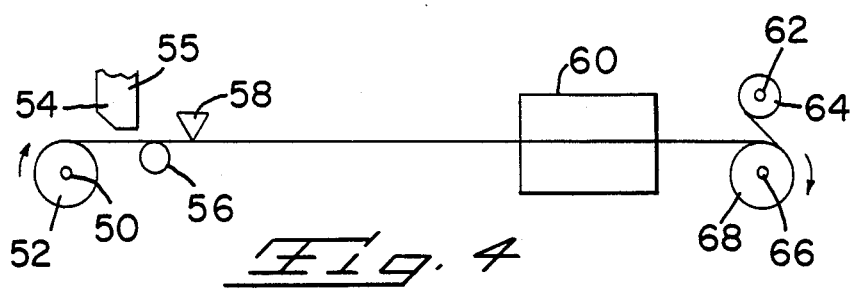
FIGS. 4 to 7 schematically illustrate the manufacturing sequence for automated production of the layered connector.
Figure 5:
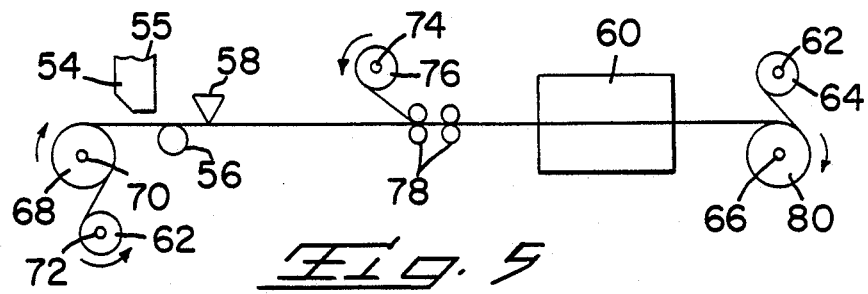

The use of master rod 14 and subsequent cutting thereof assures product uniformity and reduces production costs by avoiding the need to build and cure each individual component. Precise and easily adjusted thickness of the sliced portion from master rod 14 is achieved by holding master rod 14 under slight compression and cutting with a sharp, single-side-beveled cutting blade mounted on a milling machine. Single-sided-beveling of the cutting blade has been noted to produce a clean cut and facilitates separation and removal by peeling of the sliced section from master rod 14. Each of the slices are then cut to a desired length in the cross-sectional plane of master rod 14. As illustrated in FIG. 2, where rod 14 is cut along lines 15A and 15B according to this technique, the result is four essentially identical, quarter-inch square, layered elastomeric connectors 16 depicted in FIG. 3.

An alternative process for formulating the above-described conductive fiber mat based LEC is to forego the need of layered dielectric elastomer sheets 12 (spacers). Strips of Panex fiber paper are coated with a silicone resin by immersion into a bath of liquid silicone rubber (LSR). Dow Corning Silicone Rubber 595 diluted with toluene to reduce the viscosity of the bath was found satisfactory for this purpose. Liquid silicone rubbers are characterized as a 2 part system including a fast-acting noble metal (platinum) catalyzed rubber. Thus, the need for peroxide curing agents is eliminated.

Once coated, the strips are withdrawn between two threaded bolts which act as doctor blades to insure a uniform coating on both surfaces of the strip. Once withdrawn, the strips are dried in an oven for fifteen minutes at 100 degrees Celsius and cut into one-inch squares. In the same manner described above, the elastomer coated fiber paper is stacked, clamped and cured at 200 degrees Celsius in an oven for approximately a half an hour. Like the connector described above, this process produces a unitary fused connector. This second method proves advantageous when a large number of redundant contacts is preferred because the method eliminates the need for the thicker elastomeric sheets. Thus, the contact spacing, the separation of the conductive fibers, is reduced and the efficiency of the connector enhanced.

FIGS. 4 to 7 sequentially illustrate a manufacturing system for production of connector 16. Spool 50 secures a roll of 18-inch wide polyester film carrier sheet 52 (e.g., MYLAR). As sheet 52 is unrolled, it passes under feed chamber 54 containing a LSR 55 (described above). Although Dow Corning's LSR 595 is preferred, other two-part LSR's can be used such as, for example, Dow Corning's 591. The two parts are preferably mixed in equal parts ensuring not to entrain air when placed in feed chamber 54. Roller 56 supports sheet 52 bearing liquid LSR on its upper surface which passes under doctor blade 58 thereby controlling the thickness and producing a 3-mil layer of LSR. Carrier sheet 52 then moves into oven 60 at 300 degrees Fahrenheit (148 degrees Celsius) which cures LSR 55. Passing from oven 60, carrier sheet 52 bearing the cured LSR layer moves toward take-up spool 66. Adjunct spool 64 bears a roll of slip sheet 62 (polyethylene) which is interlayered with rolled sheeting 68 on take-up spool 66. Slip sheet 62 facilitates subsequent unrolling of sheeting 68.

The next undertaking involves unrolling sheeting 68 on supply roller 70. Slip sheet 62 take up roller 72 removes interlayered slip sheet 62 from the upper surface of the carrier sheet. A second layer of LSR 55 is coated on the first in the same manner as the first, with the proviso that it is 6 mils thick. Graphitized carbon paper 76 having a thickness of 5 mils is unwound from adjunct source spool 74 and pressed into the liquid LSR layer by nippers 78 in a manner that the lower surface of paper 76 is impregnated and the upper surface is exposed. Carrier sheet 52 moves the laminated materials into over 60 set at 176 degrees Celsius (330 degrees Fahrenheit) which leads to complete curing and bonding of LSR coatings together. A slip sheet 62 feed and interlayering processes is employed upon take-up of laminated sheeting 80. The above-described dual lamination technique ensures that paper 76 will not fully penetrate through LSR 55 when it is pressed into the second layer.

Figure 6:
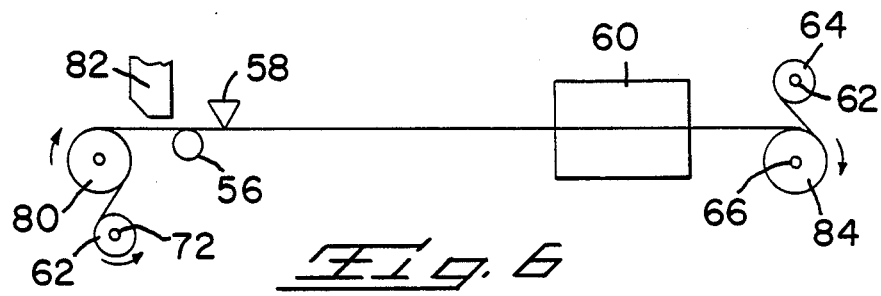
Figure 7:
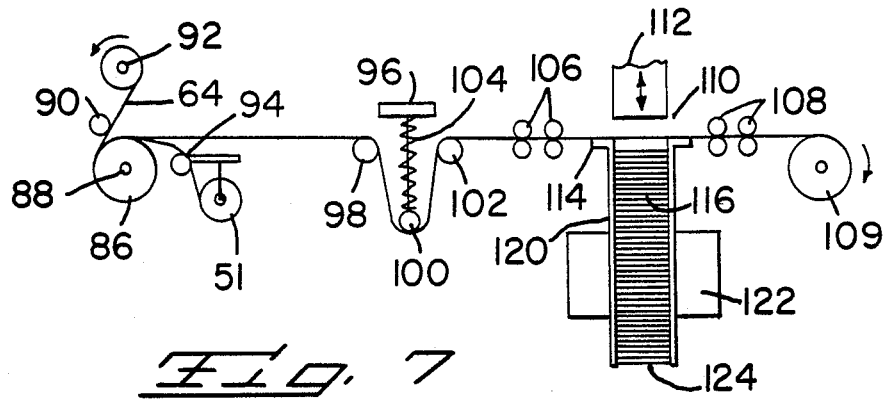

In FIG. 6 is illustrated the supplementary primer coating step for laminated sheet 80. Interlayered slip sheet 62 is removed and laminated sheet 80 is coated with Laur 201, a preferred primer due to its low viscosity and ease of penetration of laminated sheet 80. The solvent is removed from the primer by air, vacuum evaporation or warming in over 60 at approximately 93 degrees Celsius (200 degrees Fahrenheit). Primed, laminated composite sheet 84 is wound up on take-up roll 66 and again interlayered with slip sheet 62. It is preferred, at this point, that sheet 84 be slit into 1¼-inch wide tapes 86.

Tape 86 is then processed into a laminated connector employing the following apparatus and procedure: Interlayered tape 86 is loaded into spool 88 from which adjunct spool 92 takes up slip sheet 64 after it passes around roller 90. Carrier sheet 52 is removed from laminated composite layer 86, passing around a roller at 94 and onto take-up spool 51. Tape 82 then passes into slack tower 96 over roller 98 under tension roller 100 attached to spring assembly 104 and then over exit roller 102. Following exit from slack tower 96, tape 86 passes through tension nipper rollers 106 and into stamping press 110 comprising reciprocating stamper 112 and one-inch square aperture containing base frame member 114. Stamper 112 impacts on tape 86 cutting it into one-inch squares 116. The transport of the tape 26 into the stamping press 110 is synchronized with the stroke of the press 112, preferably by an electric stepper motor although other methods can be used. The remaining portions of tape 86 pass through tensioning nipper rollers 108 and is collected on take-up roller 109. Meanwhile, squares 116 collect in one-inch square tube 120 and are compressed therein by the repeating piston action of reciprocating stamper 112. Tube 120 passes through 148 degrees Celsius (300 degrees Fahrenheit) over 122 where the primer is activated and cements composite squares 116 together into a stratified unitary rods 124 which exit from the end of tube 116. Rods 124 are then cut and processed in much the same manner as master rod 14 described above.

Figure 8:
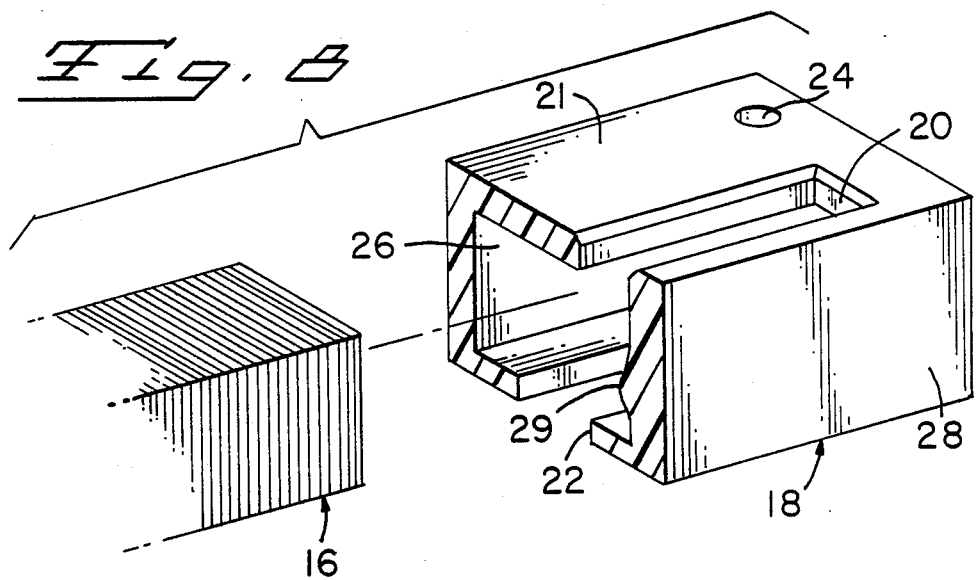
FIG. 8 is a cutaway perspective view of an LEC and its complementary housing contemplated by the invention.

FIG. 8 schematically represents layered connector 16 and its complementary connecting housing 18. Housing 18 is constructed of a thermoplastic material such as polyethylene nylon, polybutylene terephthalate so that it possesses shape stability and requisite strength for a connector housing. Housing 18 provides a configuration selected to assure adequate contact between connector 16 and another article such as a circuit board.

Housing 18 is a six-sided, elongated, rectangular container including upper elongated slot 20, lower elongated slot 22, bore hole 24, and cavity 26. Cavity 26 extends virtually the entire length, excepting the end walls, of housing 18. Upper elongated slot 20 and lower elongated slot 22 are substantially the same length as cavity 26. Upper slot 20 runs parallel to and is contiguous with exterior wall 28. The remaining upper surface, forming upper wall 21, is of a width nearly equal to that of connector 16. Lower slot 22 is centrally disposed along the elongated axis of the lower wall of housing 18. Therefore, slots 20 and 22 do not lie within the same vertical plane within housing 18. The importance of offsetting slots 20 and 22 will become apparent below. Wall 28 features interior ridge 29 which extends the entire length of cavity 26. Ridge 29 protrudes from wall 28 within cavity 26 facing connector 16.

Figure 9:
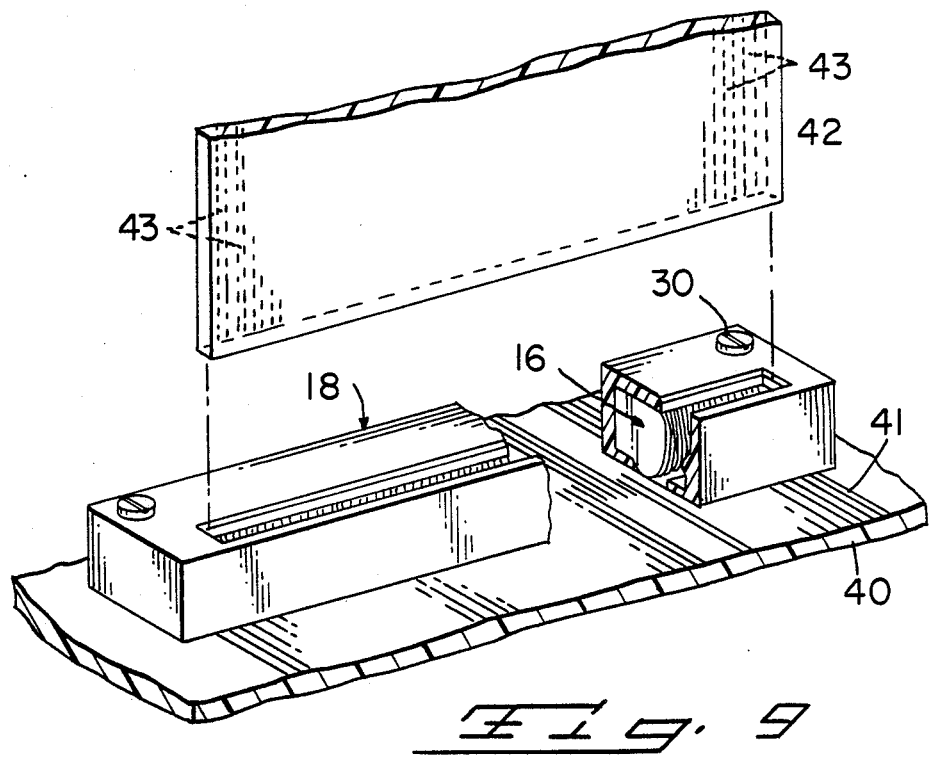
FIG. 9 is a partial perspective view of one embodiment of the invention as assembled.

More clearly illustrated in FIG. 9, connector 16 is lodged within cavity 26. The length of connector 16 is substantially equal to that of cavity 26 but the height of cavity 26 is slightly less than the width of connector 16, therefore, requiring connector 16 to be slightly compressed when seated within cavity 26. Due to the slight compression required to seat connector 16 within housing 18 and the elastomeric nature of connector 16, some displacement occurs therein. More particularly, the compression of connector 16 causes it to bulge within lower slot 22 and protrude into the space facing ridge 29. Accordingly, when properly seating within housing 18, connector 16 is not perfectly rectangular but is displaced in two directions; into lower slot 22 and toward ridge 29.

Figure 10:
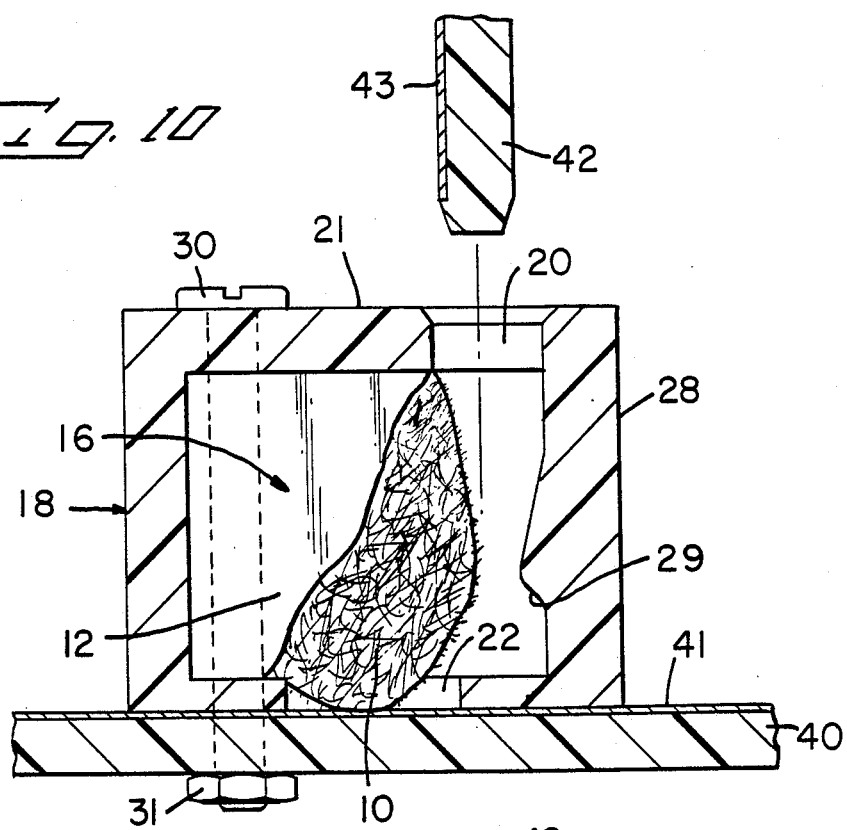
FIGS. 10 and 11 sequentially illustrate a low insertion force interconnection between two surfaces bearing electrical traces as contemplated by this invention.
Figure 11:
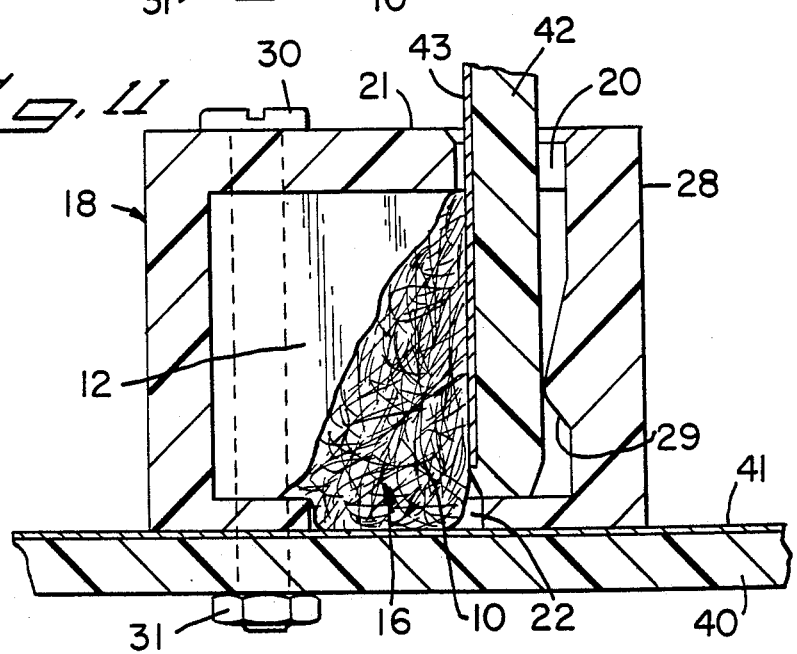

FIGS. 10 and 11 pictorially represent the means by which electrical contact is established by use of this invention. Housing 18, containing connector 16, is attached to circuit board 40 by way of screw 30, which passes through hole 24 in housing 18 and through a complementary hole provided in board 40. Screw 30 secures container 18 to board 40 with nut 31. Connector 16 is in a light contact position with electrically transmittive features 41 located on the upper surface of board 40 as illustrated in FIG. 10. A second board 42, containing electrically transmittive features 43 along one surface is inserted through slot 20 and to the base of cavity 26 so that features 43 contact connector 16. As clearly represented in FIG. 11, the insertion of board 42 into cavity 26, generates compressive force which further distorts elastomeric connector 16 causing greater expansion into slot 22. It can be appreciated that the further expansion of connector 16 into slot 22 increases the contact surface area and, therefore, creates a more substantial contact between connector 16 and transmittive surface 41. Furthermore, by this arrangement, the contact area between connector 16 and surface 41 is environmentally sealed from the atmosphere. Ridge 29 provides a spacer between the back of board 42 and wall 28 thereby causing even greater compressive force on elastomeric connector 16 which in turn assures substantial and complete contact as well as an environmental seal between connector 16 and transmittive surface 43.

The contact established between connector 16 and transmittive surface 43 is established by the frictional engagement generated by sliding board 42 along connector 16 in cavity 26. The rubbing, more commonly referred to as wiping contact, describes the contact between electrically conductive fibers forming connector 16 and transmittive surface 43. The wiping contact serves not only to wipe oxidation, etc. from the transmittive elements 43 but also to seal the final contact position from deleterious atmospheric elements. Moreover, the contact resistivity is reduced between electrically transmittive surfaces 41 and 43 and layers 10.

Because connector 16 and cavity 26 are of substantially identical length, the compressive nature of the seating of connector 16 within housing 18, distorts connector 16 in only the vertical (cross-sectional) plane. This vertical distortion, in contrast to anisotropic displacement maintains alternating layers 10 and 12 in parallel, vertical relationship thereby assuring matching contact in the vertical plane between surface 43 and surface 51. Accordingly, a single transmittive element 41 will be satisfactorily connected to its corresponding transmittive element 43 through conductive connector layers 10. Indeed, the particular arrangement contemplated by this invention is intended to provide redundant contact surfaces, i.e., a plurality of connector fibrous conductive layers 10 corresponding to each transmittive element 41 and corresponding element 43 on boards 40 and 42, respectively.

To assess uniformity and assure quality control, testing and evaluation procedures have been established for LEC 16. The connector resistance is measured by clamping LEC 16 between two gold-plated electrodes. The electrodes are connected to a 100-milligram constant current power supply such as that manufactured by Hewlett Packard. At constant current, measuring the voltage drop with a voltmeter between the electrodes permits calculation of the resistivity. The volume resistivity ($\rho$) of each conductive fiber layer may also be determined by multiplying the calculated resistance (R) by the cross-sectional area of the LEC and then dividing the result by the conductive path length (CPL). The volume resistivity of LEC may vary due to the number of conductive traces contained (number of conductive layers per length). Therefore, it is desirable to determine comparative resistivity rather than an absolute measurement. The following formula may be used for this purpose so long as the assumption that each conductive layer is of equivalent resistivity:

$$\rho = \frac{R \times N \times W \times H}{CPL}$$

where
$\rho$ = volume resistivity
R = calculated resistance (determined by voltage drop)
A = averaged over number of conductive layers
N = number of conductive layers
W = width of conductive layers
H = height of conductive layers
CPL = conductive path length The following sample calculation is provided to illustrate the use of the formula:
Given:
R = 0.077 ohms (as calculated)

N=17 (number of elements)
W=1.27×10⁻²cm
H=0.7 cm
CPL=0.2 cm
Assume:

$$R_1 = R_{17}$$

where $(1/R) = (1/R1) + (1/R2) \ldots (1/R17)$
Therefore:

$$R = (R_N/17)$$

RN=17R (17×0.077)=1.31 ohms
and;

$$\rho \text{ element} = \frac{1.31 \text{ ohms} \times 1.27 \times 10^{-2} \text{ cm} \times 0.7 \text{ cm}}{0.2 \text{ cm}}$$

$\rho$ element=0.065 ohm cm

The above-described preferred embodiments are intended to be illustrative, not limitive. For example, a rectangular connector is described. However, it is appreciated that the above-described connectors may have cross sections of many geometries; cylindrical C-shaped, T-shaped, as well as other irregular configurations desired for a particular purpose.

Other such variations and modifications of the invention should now be obvious to the skilled artisan and are intended to fall within the spirit and scope of the invention as defined by the following claims:

I claim:

1. An electrical connector for electrically connecting conductive areas of first and second members comprising an elongated member which defines a length axis and a cross sectional surface that extends between the first and second member, said elongated member comprising:
   a plurality of electrically conductive fibrous mat layers, each of said mat layers coextensive with said cross sectional surface each mat layer having randomly positioned fibers which are in electrical engagement with each other;
   a plurality of dielectric elastomeric layers, each disposed between a respective adjacent pair of said mat layers such that the elastomeric layers separate said mat layers and prevent electrical transmission therebetween and adjacent pairs of said mat layers are aligned along the length axis, said mat layers and said elastomeric layers adhered together to form said elongated member;
   whereby the conductive fibrous mat layers of the electrical connector have enhanced conducting characteristics due to the low resistance of the fibers of the fibrous mat layers, and the dielectric elastomeric layers, as well as the conductive fibrous mat layers, have the resilient characteristics to insure that a positive electrical connection is effected between the conductive areas of the first and the second members.

2. An electrical connector as claimed in claim 1, characterized in that the fibers forming said mat layers are plated with an electrically-conductive metal.

3. An electrical connector as claimed in claim 1, characterized in that the fibers forming said mat layers are of graphite carbon.

4. An electrical connector as claimed in claim 1, characterized in that the mat layers are flexible.

5. An electrical connector as claimed in claim 1, characterized in that said elastomeric layers are bonded to the mat layers by the elastomeric material of the elastomeric layers.

6. An electrical connector as claimed in claim 1, characterized in that a coupling agent promotes bonding between the conductive fibrous mat layers and the elastomeric layers, the coupling agent being selected from the group of a silicone rubber dispersion, an amino-silicon functional coupling agent such as N- -amoethyl--amino propyl trimethoxysilone or a titanate coupling agent.

7. An electrical connector as claimed in claim 1, characterized in that said elastomeric layers comprise a silicone rubber.

8. An electrical connector as claimed in claim 1, characterized in that said elastomeric layers comprise a vulcanized silicone rubber.

9. An electrical connector as claimed in claim 1, characterized in that a housing member has a space in which said elongated member is disposed, said housing member is mountable onto a first circuit board having conductive members, a first opening is located in said housing member through which part of said elongated member extends so that the conductive fibers of said fibrous mat layers electrically engage the conductive members, and a second opening is located in said housing member through which an end of a second circuit board having conductive members passes so that the conductive members are electrically engageable with the conductive fibers of the fibrous mat layers.

10. The electrical connector as claimed in claim 1 wherein said cross sectional surface extends completely across the elongated member.

11. The electrical connector as claimed in claim 1 wherein each of said mat layers comprises a respective conductive fiber paper sheet.

12. The electrical connector as claimed in claim 1 wherein each of said mat layers comprises a respective carbon paper sheet.

13. The electrical connector as claimed in claim 1 wherein each of said mat layers is shaped as a thin sheet having a smallest dimension aligned with the axis.

14. An electrical connector for electrically connecting conductive areas of first and second members, comprising:
   layers of dielectric elastomeric material and conductive members being in the form of sheets of a fabric of conductive fibers wherein the fibers are randomly positioned in electrical engagement with each other to form the fabric, said elastomeric material being in the form of elastomeric sheets, said sheets of fabric of conductive fibers being disposed between said elastomeric material and conductive areas for electrical connection with the conductive areas of the first and second members;
   whereby the sheets of conductive fibers of the electrical connector have enhanced conductive characteristics due to the low resistance of the fibers, and the layers of dielectric elastomeric material, as well as the sheets of conductive fibers, have the resilient characteristics required to insure that a positive electrical connection is effected between the conductive areas of the first and the second members.

15. An electrical connector as claimed in claim 14 wherein the fabric of conductive fibers comprises carbon fiber paper.

16. An electrical connector for electrically connecting conductive areas of first and second members comprising an elongated member formed of dielectric elastomeric material and conductive members, characterized in that:

said conductive members are in the form of a conductive fibrous mat layer having randomly positioned fibers which are in electrical engagement with each other and said dielectric elastomeric material is in the form of an elastomeric sheet, said fibrous mat layer being disposed between elastomeric sheets, and said fibrous mat layers and said elastomeric sheets being adhered together forming the elongated member;

a housing member has a space in which said elongated member is disposed, said housing member is mountable onto a first circuit board having conductive members, a first opening is located in said housing member through which part of said elongated member extends so that the conductive fibers of said fibrous mat layers electrically engage the conductive members, and a second opening is located in said housing member through which an end of a second circuit board having conductive members passes so that the conductive members are electrically engageable with the conductive fibers of the fibrous mat layers;

said housing member has an arcuate section on an inside surface thereof which urges the end of the second circuit board into engagement with the elongated member.

17. An electrical connector for electrically connecting conductive areas of first and second members, comprising:

a stack of insulating members and conductive members bonded together to form a continuous connector member having a uniform cross section along an axis, said insulating members alternating with said conductive along said axis such that said insulating members separate and electrically insulate adjacent pairs of said conducting members, said insulating members and said conductive members each shaped to correspond said uniform cross section;

each of said insulating members comprising a respective elastomeric layer;

each of said conductive members comprising a respective self-supporting fibrous mat layer comprising randomly positioned conductive fibers which provide low resistance electrical interconnections and which are essentially free to move with respect to each other when a compressive force is applied thereto;

whereby said conductive members have enhanced conductive characteristics due to the low resistance of the conductive members, and said insulating members, as well as said conductive members, have the resilient characteristics to insure that a positive electrical connector is effected between the conductive areas of the first and the second members.

18. An electrical connector as claimed in claim 17 wherein each of said mat layers comprises a respective conductive fiber paper sheet.

19. An electrical connector as claimed in claim 17 wherein each of said mat layers comprises a respective carbon paper sheet.

20. An electrical connector as claimed in claim 17 wherein each of said mat layers is shaped as a thin sheet having a smallest dimension aligned with said axis.

* * * * *